US00RE48712E

(19) United States
(12) Reissued Patent
Dong

(10) Patent Number: US RE48,712 E
(45) Date of Reissued Patent: Aug. 31, 2021

(54) COLOR MIXING OPTICS FOR LED LIGHTING

(71) Applicant: Lutron Technology Company LLC, Coopersburg, PA (US)

(72) Inventor: Fangxu Dong, Austin, TX (US)

(73) Assignee: Lutron Technology Company LLC, Coopersburg, PA (US)

(21) Appl. No.: 16/198,005

(22) Filed: Nov. 21, 2018

Related U.S. Patent Documents

Reissue of:
(64) Patent No.: 9,500,324
Issued: Nov. 22, 2016
Appl. No.: 14/474,408
Filed: Sep. 2, 2014

(51) Int. Cl.

| | |
|---|---|
| ***F21K 99/00*** | (2016.01) |
| ***F21V 7/06*** | (2006.01) |
| ***F21V 7/00*** | (2006.01) |
| ***F21V 13/04*** | (2006.01) |
| ***F21K 9/232*** | (2016.01) |
| ***F21K 9/62*** | (2016.01) |
| *F21Y 113/17* | (2016.01) |
| *F21Y 113/10* | (2016.01) |
| *F21Y 115/10* | (2016.01) |

(52) U.S. Cl.
CPC ..... *F21K 9/232* (2016.08); *F21K 9/62* (2016.08); *F21V 7/0025* (2013.01); *F21V 7/0091* (2013.01); *F21V 7/06* (2013.01); *F21V 13/04* (2013.01); *F21Y 2113/10* (2016.08); *F21Y 2113/17* (2016.08); *F21Y 2115/10* (2016.08)

(58) Field of Classification Search
CPC .... F21V 7/0025; F21V 7/0083; F21V 7/0091; F21V 7/06; F21V 13/04; F21V 5/048; F21K 9/62; F21K 9/232
See application file for complete search history.

(56) References Cited

U.S. PATENT DOCUMENTS 1,888,995 A 11/1932 Matter
4,767,172 A * 8/1988 Nichols ..... F21V 7/0091 355/1

(Continued)

FOREIGN PATENT DOCUMENTS

EP 2180232 4/2010
EP 2180232 A1 4/2010

(Continued)

OTHER PUBLICATIONS

International Search Report & Written Opinion for PCT/IB2015/001435 dated Nov. 12, 2015.

*Primary Examiner* — James A Menefee
(74) *Attorney, Agent, or Firm* — Condo Roccia Koptiw LLP

(57) ABSTRACT

Color mixing optics for a multi-color LED lamp comprise an outer reflector having a paraboloidal surface of revolution and a total inner reflection (TIR) lens having an outer contour with a paraboloidal surface of revolution. The outer reflector and the TIR lens are centered around a common center axis. A common focal point of the outer reflector and the TIR lens is provided for placing a LED assembly. Such LED lamps produce uniform color throughout the entire light beam while the outer dimensions are such that the optics fit into conventional lamp housings.

38 Claims, 6 Drawing Sheets

(56) References Cited

U.S. PATENT DOCUMENTS 7,349,163 B2 * 3/2008 Angelini ..... F21K 9/00 257/99
7,401,960 B2 * 7/2008 Pond ..... B60Q 1/04 362/516
7,431,480 B2 * 10/2008 Godo ..... F21V 13/04 362/311.06
8,016,451 B2 * 9/2011 Householder ..... F21L 4/027 362/188
8,246,210 B2 * 8/2012 Angelini ..... F21L 4/027 362/187
8,469,544 B2 * 6/2013 Angelini ..... F21V 5/04 362/240
8,485,692 B2 * 7/2013 Li ..... G02B 19/0066 362/308
8,529,102 B2 9/2013 Pickard et al.
8,733,981 B2 5/2014 Jiang et al.
9,170,001 B2 * 10/2015 Schenkl ..... D06F 7/266
2004/0165388 A1 * 8/2004 Shoji ..... F21V 5/045 362/304
2008/0030986 A1 * 2/2008 Ogawa ..... H01L 25/0753 362/231
2011/0044025 A1 * 2/2011 Ikeda ..... G02B 19/0047 362/84
2012/0218765 A1 * 8/2012 Inoue ..... F21V 13/04 362/308
2013/0058104 A1 * 3/2013 Catalano ..... F21V 7/06 362/335
2013/0088142 A1 4/2013 Allen
2013/0134456 A1 5/2013 Lu
2013/0194808 A1 * 8/2013 Guercio ..... F21V 7/0025 362/296.08
2013/0314925 A1 11/2013 Jiang et al.

FOREIGN PATENT DOCUMENTS

WO 2014/043384 3/2014
WO 2014043384 A1 3/2014

* cited by examiner

COLOR MIXING OPTICS FOR LED LIGHTING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is a reissue of U.S. Pat. No. 9,500,324, issued on Nov. 22, 2016 from U.S. application Ser. No. 14/474,408, filed Sep. 2, 2014, which is hereby incorporated by reference herein in its entirety.*

BACKGROUND OF THE INVENTION

1. Field of the Invention

The invention relates to a LED lamp and color mixing optics to produce a uniform intensity distribution and a uniform color output throughout the beam pattern of the light beam produced by a multi-color LED light source for use in LED lamps.

2. Description of Relevant Art

Color LED lamps should have an even intensity and color distribution over a broad range of radiation angles. As there is no single point LED source available, the radiation of multiple LED sources must be combined to form a multi-color light source. These multiple LED sources are placed offset to each other, so there is no common focal point. To obtain an even color distribution, color mixing is required.

Conventional color mixing uses light guides which typically are large and inefficient. The rule of thumb for a light guide is that it should be about 10 times longer than the dimensions of the multi-color light source. A typical 90 Watt halogen lamp produces about 1200 lumens. An array of many large LEDs is necessary to produce such output light. Such 1200 lumen output arrays may be about 5-6 mm in diameter. If such a light source comprises multi-color LEDs, a 50-60 mm light guide would be needed to properly mix the colors. Considering that the beam needs to be shaped after color mixing, the dimensions needed for a light guide become too large to fit into conventional lamp housings.

U.S. Pat. No. 8,529,102 discloses a reflector system for a multi-color LED lamp providing color mixing. The system uses two reflective surfaces to redirect the light before it is emitted.

A lens the system with multiple curved surfaces for a multi-color LED lamp is disclosed in the U.S. Pat. No. 8,733,981. It is based on a total inner reflection (TIR) lens system which has some similarity to a Fresnel lens.

SUMMARY OF THE INVENTION

The embodiments are based on the object of making a color mixing optic for color LED lamps which produces uniform intensity and color throughout the entire light beam while the outer dimensions are such small that the optics fit into conventional lamp housings. Furthermore, the optic should be simple, robust as well as easy and cost-effective to manufacture. Another embodiment is based on the object of making a color LED lamp comprising the color mixing optic.

In an embodiment, an optic system comprises an outer reflector which preferably has a concave surface. This reflector preferably has a paraboloidal surface of revolution and is centered around a center axis. Preferably, it has a reflector focal point.

A total inner reflection (TIR) lens is provided, which has an outer contour with a paraboloidal surface of revolution and with a TIR lens focal point. Preferably, the reflector focal point is in close proximity to the TIR lens focal point most preferably at the TIR lens focal point.

Preferably, the color mixing optic is rotationally symmetrical about a center axis. Therefore it is preferred to align the outer reflector and the TIR lens with the center axis.

Furthermore, the TIR lens preferably has a concave light entrance surface by which it receives light from the at least one LED. Preferably, the light entrance surface has a spherical shape.

Preferably, the TIR lens is arranged within the outer reflector. Most preferably it is held within the outer reflector.

Preferably, the TIR lens is held by a cover, which preferably covers the outer reflector, preventing dust and debris from entering into the lamp. It is preferred, if the cover and the TIR lens are made of one piece and therefore, the TIR lens is part of the cover.

Preferably, the LED assembly or the center of the LED assembly is located close to and most preferably at the focal point.

In an embodiment, an LED lamp comprises LEDs and an optic system as mentioned before. The optic system comprises a housing enclosing the outer reflector or being part thereof, a total inner reflection (TIR) lens, and a cover.

A LED assembly holds at least one LED, preferably a plurality of LEDs. It may be based on a printed circuit board and it preferably has a heat sink. It may be part of the base. The LED assembly preferably is positioned at or close to the focal point of the paraboloidal outer reflector. Most preferably a LED surface plane is positioned at or close to the focal point of the paraboloidal outer reflector. The LED surface plane is a plane defined by the radiating surfaces of the individual LEDs of the LED assembly. The LED assembly may be covered by a protective cover, which preferably forms a LED lens. Preferably, the LED lens has a spherical shape. It is preferred to align the (optical) center of the LED assembly, the outer reflector and the TIR lens with the center axis. The LED assembly may be held by a base to the housing.

The optics still works with comparatively large LED arrays, where individual LEDs are spaced apart in the range of tenths of millimeters to millimeters. Furthermore, the optics works with a plurality of colors and is therefore usable for multicolor LEDs, as the color mixing properties are largely independent of the wavelength.

In this embodiment, for the first time an LED lamp can be built which provides accurate white light along the black body curve along with saturated colors. This lamp may be implemented in a PAR form factor, preferably a PAR that provides uniform color throughout the standard 10, 25, 40 degree beam angles.

It is essential for these embodiments, that almost all the light radiated by the LEDs is only reflected by either the outer reflector or by the TIR lens, thus avoiding any refraction which is wavelength dependent and therefore causes deviation in the color distribution.

Another embodiment relates to an LED lamp comprising a housing, a socket, a power supply, and/or driver, an LED assembly and the optics comprising an outer reflector, a TIR lens, and preferably a cover.

A further embodiment relates to a method for generating a mixed beam of light. First, light of multiple wavelengths is generated by a LED assembly comprising a plurality of LEDs. After generating the light, deflecting the light in two portions take place. A first portion of the light is deflected by an outer reflector having a paraboloidal surface of revolution centered around a center axis and defining a reflector focal point. A second portion of the light is deflected by a total inner reflection (TIR) lens having an outer contour with a paraboloidal surface of revolution centered around the center axis and defining a TIR lens focal point. The reflector focal point is in close proximity to the TIR lens focal point. This method may be combined with any of the embodiments disclosed herein.

BRIEF DESCRIPTION OF THE DRAWINGS

In the following, the invention will be described by way of example, without limitation of the general inventive concept, on examples of embodiment and with reference to the drawings.

Figure 1:
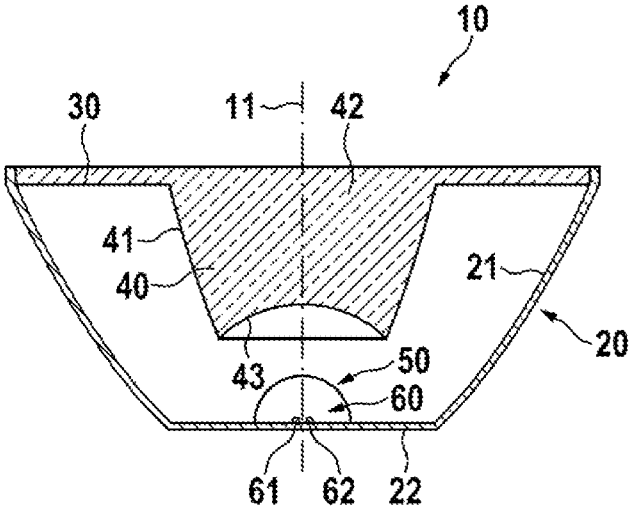
FIG. 1 shows a sectional view of a first embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1, a sectional view of a first embodiment is shown. A color mixing optic 10 comprises an outer reflector 21 which preferably is held in a housing 20, or which may be a part thereof. It further comprises a total inner reflection (TIR) lens 40 which preferably is held by a cover 30 on or within the outer reflector 21 and/or the housing 20. The TIR lens comprises a body of an optic material which may be plastic material or glass. It has an outer contour 41 which in one embodiment is defined by a paraboloidal surface of revolution about a center axis. In other embodiments, the outer contour 41 of the TIR lens 40 may be substantially conical in shape. In addition to the outer contour 41, the TIR lens 40 preferably has a concave shaped light entrance surface 43 and a light exit surface 42. The concave light entrance surface 43 preferably has a substantially spherical shape, and most preferably has a radius of curvature that enables light rays emitted by an LED assembly to pass through the concave light entrance surface 43 without refraction. The light exit surface 42 is preferably a planar surface, and most preferably is connected to and/or part of the cover 30.

An LED assembly 60 is attached to the outer reflector and/or the housing, preferably by a base 22, although it may be held independently thereof. The LED assembly comprises a plurality of LEDs 61, 62. It preferably has a cover 50 which may be a protective cover and/or forming a LED lens. The LED assembly 60 may be mounted to a base which may be a printed circuit board and/or a heat sink. Preferably, the LED assembly is arranged on a common center axis 11 which preferably is the center axis of the outer reflector 21 and of the TIR lens 40. Furthermore, it is preferred that the LED assembly is arranged at a common focal point of the outer reflector 21 and the TIR lens 40, as will be shown later.

Figure 2:
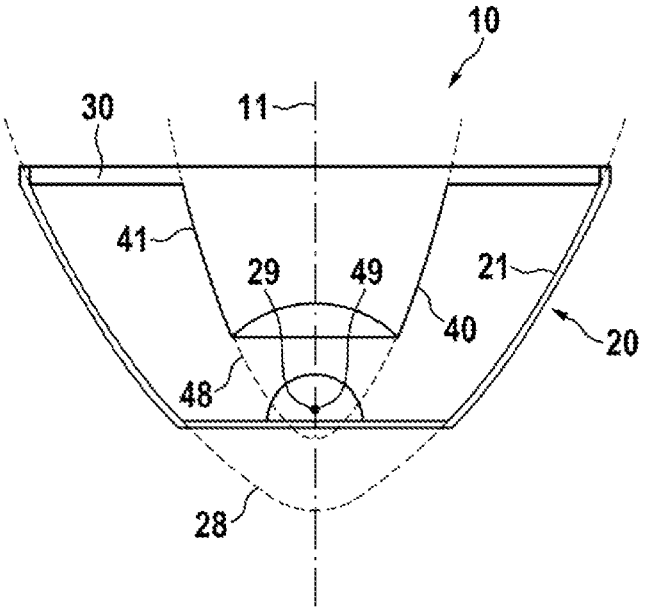
FIG. 2 shows details of the color mixing optic.
Figure 9:
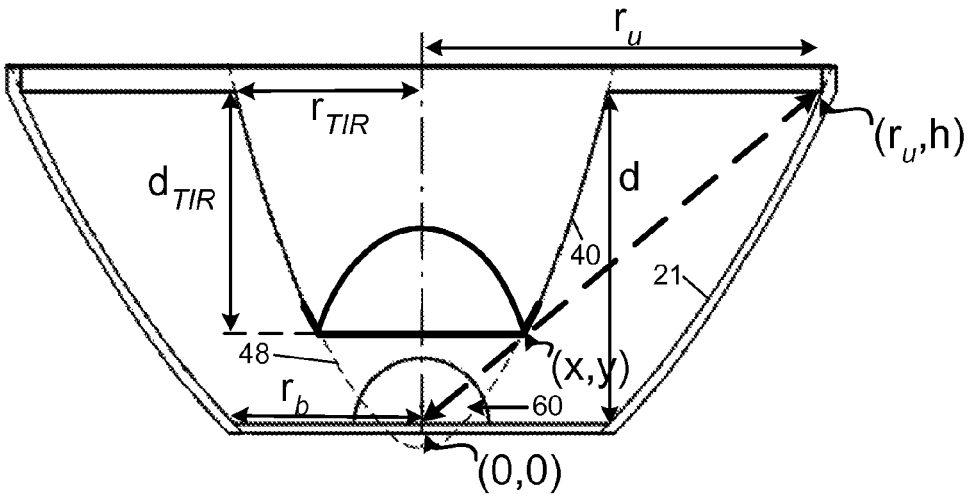
FIG. 9 shows further details of the color mixing optic.

In FIG. 2, details of the color mixing optic are shown. Preferably, the outer reflector 21 has a paraboloidal surface of revolution. It is defined by a revolution of the reflector parabola 28 around the center axis 11. This parabola defines a reflector focal point 29. The TIR lens 40 preferably has a paraboloidal surface of revolution defined by a TIR lens parabola 48, which is revolved about the center axis 11, and which defines a TIR lens focal point 49. Most preferably, the TIR lens focal point 49 is the same point as the reflector focal point 29. It is further preferred, that the LED assembly is arranged close to or at the common focal point 29, 49. Further details of the color mixing optic are shown in FIG. 9 and discussed below.

Figure 3:
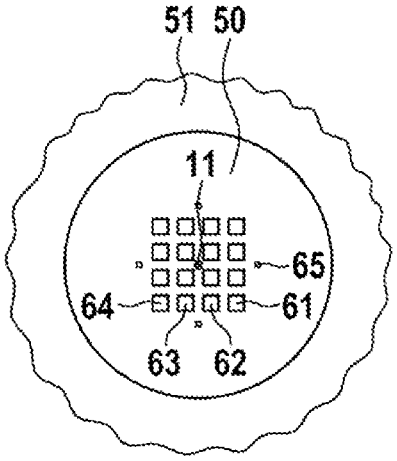
FIG. 3 shows a detail of the LED assembly.

In FIG. 3, the LED assembly 60 is shown in detail. A plurality of LEDs 61-64 may be arranged on the LED assembly. There may be a printed circuit board holding the LEDs, which may be covered by a LED lens 50. In this embodiment, there is a set of four LEDs comprising LEDs for red, green, and blue, as well as a phosphor-converted white LED for providing whites and pastels. It is preferred that a plurality of such sets of four LEDs is provided. In this embodiment, four of these sets are arranged in a 4×4 matrix. Preferably, this arrangement or this matrix is centered around the center axis 11. It is further preferred that at least one sensor which may be a LED or a photodiode 65 is provided for measuring the emitted light intensity.

Figure 4:
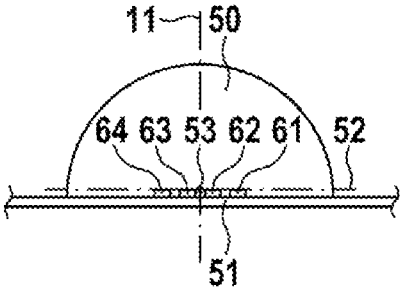
FIG. 4 shows a side view of the LED assembly.

In FIG. 4, a side view of the LED assembly 60 is shown. Here, the convex shape of the LED lens 50 can be seen. Preferably, the geometrical and/or optical center of the LED assembly is aligned with the center axis 11. The LEDs 61, 62, 63, 64 may be surface-mounted on a PCB 51. These LEDs define a surface plane 52, which may be the top surface and which preferably is the plane on which light of the LEDs is emitted. It is preferred that the intersection 53 of this plane 52 with the center axis 11 is located at the reflector focal points 29, 49.

Figure 5:
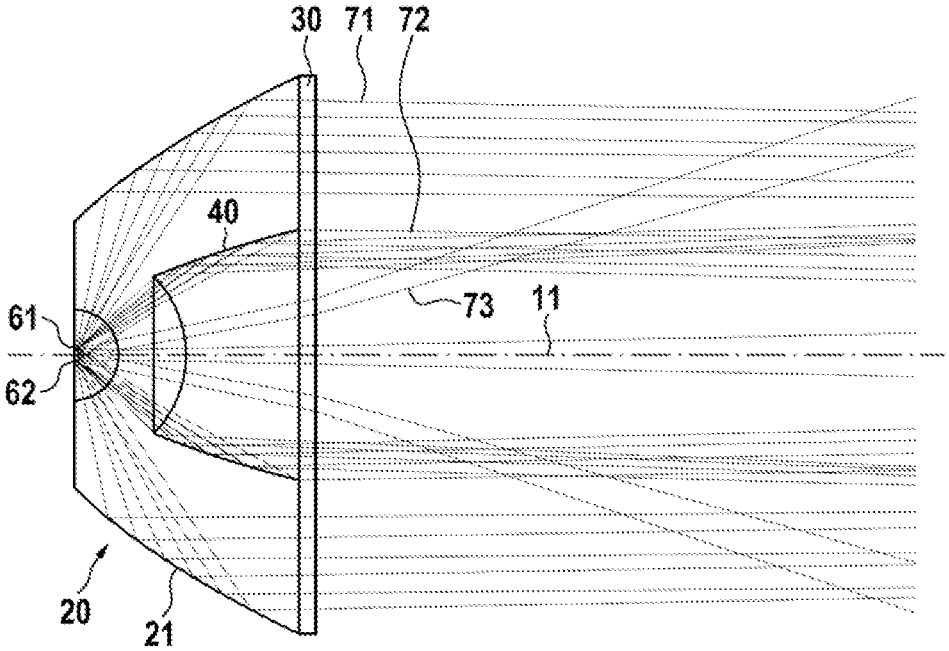
FIG. 5 shows ray traces of the embodiments.

In FIG. 5, ray traces of a preferred embodiment of the color mixing optic 10 are shown. In this figure, for simplicity only rays originating from a first LED 61 and second LED 62 are shown. There is a first set of rays 71 originating from the LEDs 61, 62 and reflected by the outer reflector 21. These rays are propagating approximately parallel to the center axis 11. A second set of rays 72 is originating from the LEDs 61, 62 and reflected by the TIR lens 40. As it can be seen, these rays are also propagating approximately parallel to the center axis 11 and having a comparatively small deviation. This is important for color mixing.

Figure 6:
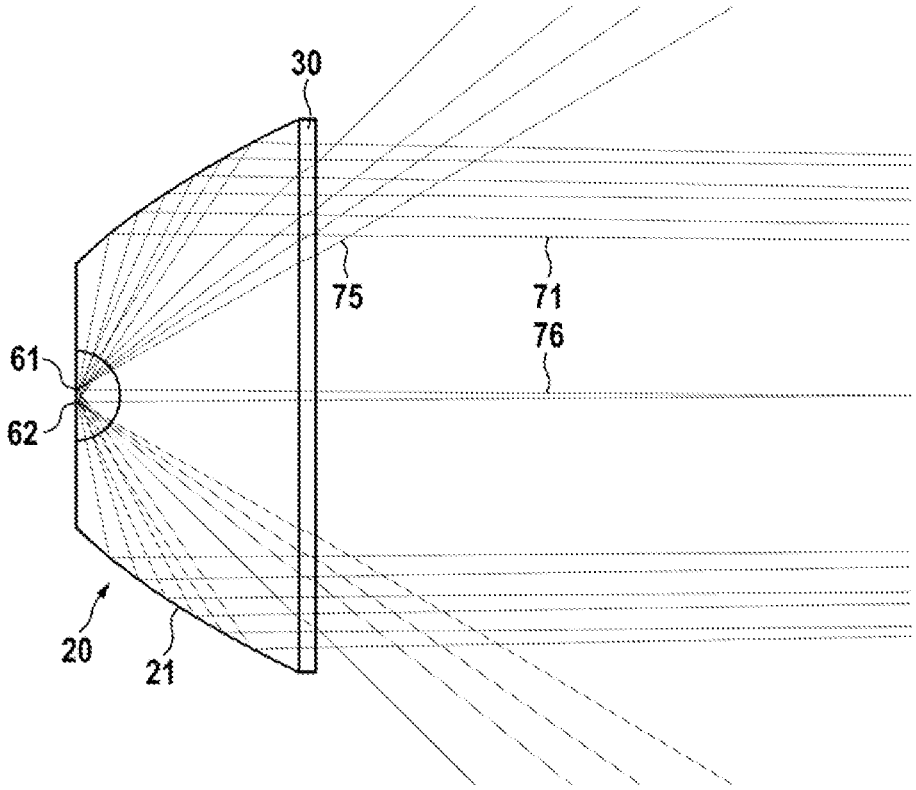
FIG. 6 shows a lamp without TIR lens.

To obtain a uniform color distribution, the rays originating by the individual LEDs 61, 62 should be projected to approximately the same point. In the embodiment of FIG. 6, the displacement of the individual rays originating from LEDs 61 or 62 is mainly given by the spatial displacement of the LEDs on the LED assembly. It is not dependent on the wavelength of the light emitted by LEDs, since the outer reflector 21 and the TIR lens 40 are specifically designed to reflect light rays 71 and 72, so that there is no refraction in the path of light. Providing a TIR lens 40 design that avoids refraction is important, since refraction changes the propagation path of the emitted light depending on the light wavelength.

As shown in FIG. 6, the light emitted from the LEDs 61, 62 propagates at a right angle through the spherical surface of the LED lens 50. Due to the concave shaped light entrance surface 43 of the TIR lens 40, the light enters the TIR lens at a right angle to the concave light entrance surface 43, therefore avoiding refraction. Finally, the light exits the optic through the cover 30 at an approximately right angle to the planar surface of the cover 30, further preventing any refraction. Avoiding any refraction is one of the fundamental points of these embodiments. The light from the LEDs 61, 62 is only reflected either by the outer reflector 21 or by the TIR lens 40. As refraction typically is wavelength dependent, no compensation is required, keeping the design simple and inexpensive. Furthermore, deviations in the color distribution due to wavelength dependent effects are avoided.

Finally, there are third set of rays 73 which propagate from LEDs 61, 62 via LED lens 50 through light entrance surface 43 and which are not reflected by the outer reflector 21 or the TIR lens 40. As these rays propagate through the planar light exit surface 42 and/or the cover 30 at some angle other than 90°, there is refraction, leading to a deviation of the light rays with respect to the center axis 11. However, this part of the light is only a small part of the total radiation of the LEDs. It is further distributed over a wide angle and mixes with the other light of the rays 71 and 72. Therefore, it has a negligible effect on color distribution.

The color mixing optic 10 shown in FIGS. 1, 2, and 5 significantly improves the color distribution throughout the beam pattern produced by the LEDs 61, 62 by avoiding any refraction of light through the TIR lens 40. This is achieved by: (a) co-locating and aligning the focal points 29, 49 of the outer reflector 21 and the TIR lens 40 with the center axis 11, which intersects the surface plane 52 of the LED assembly at center point 53, (b) providing the TIR lens 40 with a spherical, concave light entrance surface 43, which is also centered on the center axis 11, and (c) dimensioning the TIR lens 40 so that no light rays can escape between the outer contour 41 of the TIR lens 40 and the outer reflector 21 without being collimated by the outer reflector. Exemplary dimensions for the TIR lens 40 are shown in FIG. 9 and discussed below.

Generally speaking, the depth ($d_{TIR}$) of the TIR lens 40 and the radius ($r_{TIR}$) of the upper aperture of the TIR lens 40 are dependent on the depth (d) of the outer reflector 21 and the radii ($r_u$, $r_b$) of the upper and lower apertures of the outer reflector 21. According to one embodiment, the radius ($r_{TIR}$) of the upper aperture of the TIR lens 40 is made to be substantially equal to the radius ($r_b$) of the lower aperture of the outer reflector 21. This allows the TIR lens 40 to capture and collimate as much of the emitted light as possible without interfering with the first set of rays 71 (see, FIG. 5) collimated by the outer reflector 21.

The depth ($d_{TIR}$) of the TIR lens 40 is preferably designed so that no light rays can escape between the outer contour 41 of the TIR lens 40 and the outer reflector 21 without being collimated by the outer reflector 21. In other words, the depth ($d_{TIR}$) of the TIR lens 40 should be configured to intercept all light rays, which are emitted by the LED assembly 60 above a line extending between source point (0,0) and an edge point ($r_u$, h) of the outer reflector 21. In the exemplary embodiment shown in FIG. 9, the depth ($d_{TIR}$) of the TIR lens 40 extends to point (x,y), which is the point where the TIR lens parabola 48 intersects the line extending between source point (0,0) and edge point ($r_u$, h). By configuring the TIR lens 40 as shown in FIG. 9, the color mixing optic is able to collimate a vast majority of the emitted light while producing substantially uniform intensity and color distribution throughout the entire beam pattern.

In FIG. 6, ray traces from a lamp without a TIR lens is shown. Here, a first set of rays 71 are reflected by the outer reflector 21 and are radiated approximately parallel to the center axis 11. The remaining rays 75 are radiated in all directions starting from the center to a very wide angle, resulting in a significantly wider pattern.

Figure 7:
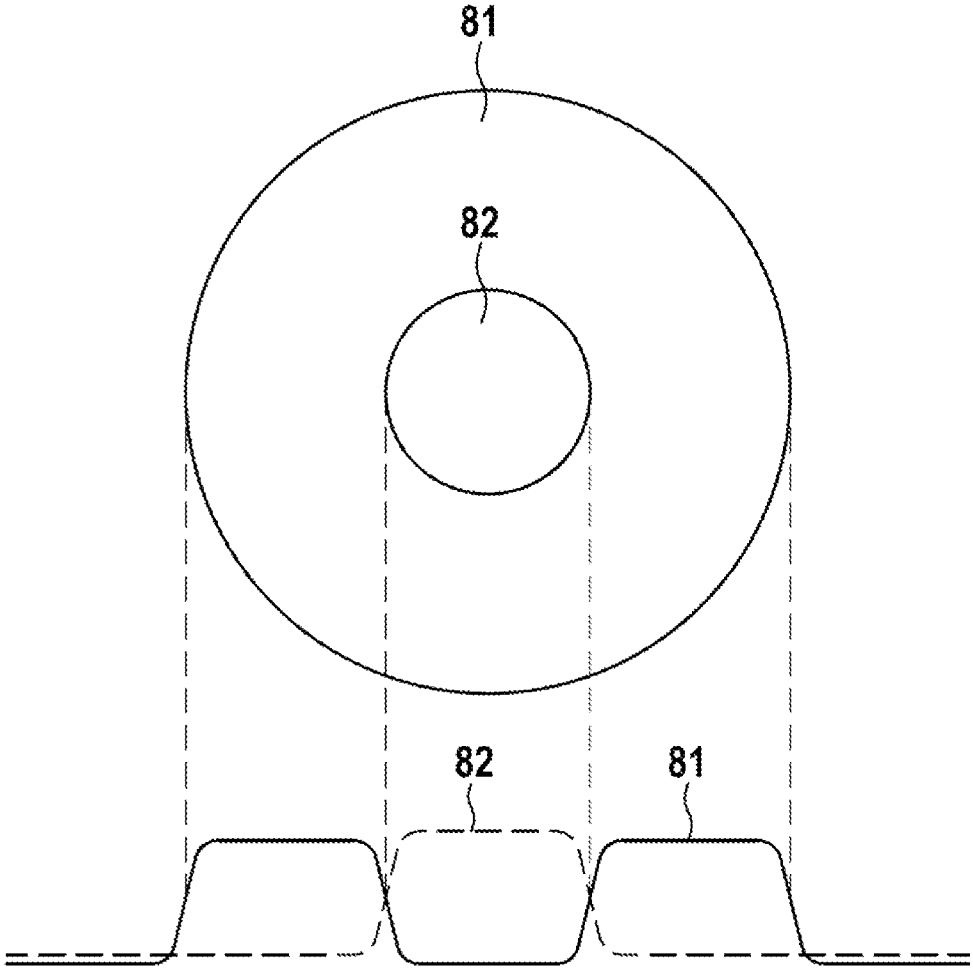
FIG. 7 shows the distribution of light intensity of the embodiments.

In FIG. 7, the distribution of light intensity of the embodiments is shown. If the light of the lamp is projected on a plane in some distance to the lamp, there will be a first approximately circular pattern 81 generated by the first set of rays 71 shown in FIG. 5. A second set of rays 72 are shown in FIG. 7 forming a second pattern 82 at the center of the first pattern. The remaining rays 75 have a negligible intensity and are not shown herein. At the bottom of the figure, the intensity distribution is shown in a section of the previous image. Here, the intensity of the second pattern 82 is approximately the same as of the first pattern 81, resulting in a uniform light distribution across the entire beam pattern.

Figure 8:
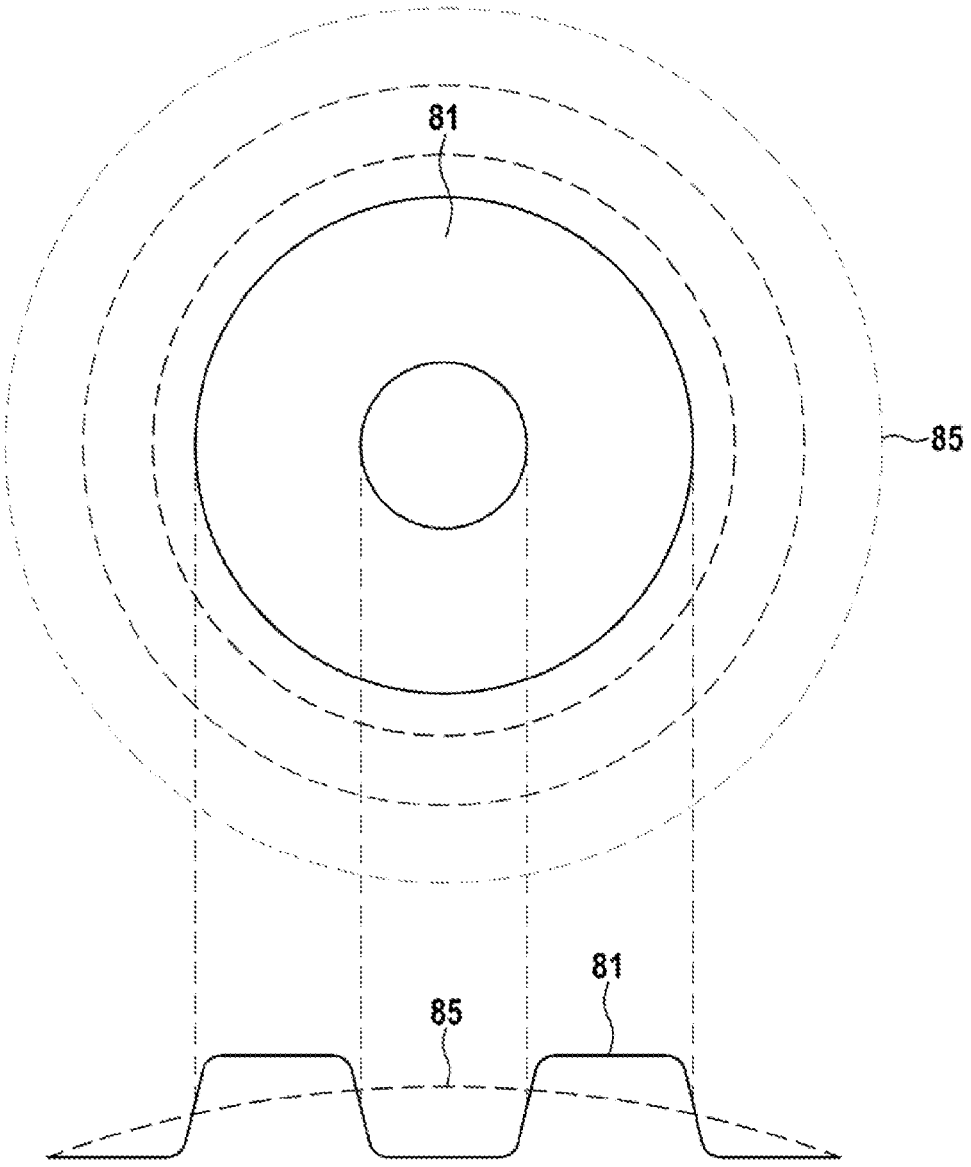
FIG. 8 shows the distribution of light intensity without TIR lens.

In FIG. 8, the distribution of light intensity of the lamp without a TIR lens is shown. Due to the lacking TIR lens, the light of beams 75, which is not reflected by the outer reflector 21, is distributed over a wide area 85, whereas the light at the center of the pattern 81 has a comparatively low intensity. This results in a beam pattern looking like a ring.

It will be appreciated to those skilled in the art having the benefit of this disclosure that this invention is believed to provide optics for LED lighting with color mixing properties. Specifically, color mixing optics are disclosed herein for producing a uniform intensity distribution and a uniform color distribution throughout the entire beam pattern produced by a multi-color LED light source. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A color mixing optics for LED lighting comprising:

an outer reflector having a paraboloidal surface of revolution centered around a center axis and defining a reflector focal point;

a total inner reflection lens having a concave light entrance surface with a radius of curvature to enable light to enter the total inner reflection lens at a right angle, and the total inner reflection lens having an outer contour with a paraboloidal surface of revolution centered around the center axis and defining a total inner reflection lens focal point, wherein the outer contour with a paraboloidal surface of revolution of the total inner reflection lens is held a spaced distance within the outer reflector; [and]

wherein the reflector focal point is in close proximity to the total inner reflection lens focal point*; and*

*wherein a first portion of light emitted by a source positioned proximate the reflector focal point and the total inner reflection lens focal point is reflected by the outer reflector and the remaining portion of the light emitted by the source is received by the concave light entrance surface of the total inner reflection lens.*

2. The color mixing optics according to claim 1, wherein the total inner reflection lens has a concave light entrance surface oriented towards the total inner reflection lens focal point.

3. The color mixing optics according to claim 2, wherein the concave light entrance surface has a spherical shape.

4. The color mixing optics according to claim 1, wherein the total inner reflection lens is positioned within the outer reflector.

5. The color mixing optics according to claim 1, wherein the total inner reflection lens is attached to a cover located on the outer reflector.

6. The color mixing optics according to claim 1, wherein the total inner reflection lens is part of a cover located on the outer reflector.

7. The color mixing optics of claim 1, wherein a radius of an upper aperture of the total inner reflection lens is substantially equal to a radius of a lower aperture of the outer reflector.

8. The color mixing optics of claim 1, wherein a depth of the total inner reflection lens extends to a point where the total inner reflection lens parabola intersects a line extending between a source point on the center axis and an edge point of the outer reflector.

9. A multi-color LED lamp comprising:

an outer reflector having a paraboloidal surface of revolution centered around a center axis and defining a reflector focal point;

a total inner reflection lens having a concave light entrance surface with a radius of curvature to enable light to enter the total inner reflection lens at a right angle, and the total inner reflection lens having an outer contour with a paraboloidal surface of revolution centered around the center axis and defining a total inner reflection lens focal point; wherein the outer contour with a paraboloidal surface of revolution of the total inner reflection lens is held a spaced distance within the outer reflector; wherein the reflector focal point is in close proximity to the total inner reflection lens focal point; and an LED assembly comprising a plurality of LEDs and being mounted in close proximity to the reflector focal point and the total inner reflection lens focal point*;*

*wherein the outer reflector reflects a first portion of light emitted by the LED assembly and the concave light entrance of the total inner reflection lens surface receives the remaining portion of the light emitted by the LED assembly.*

10. The multi-color LED lamp according to claim 9, wherein the LED assembly or parts thereof are covered by [a] *an* LED lens.

11. The multi-color LED lamp according to claim 10, wherein the LED lens has a spherical shape.

12. The multi-color LED lamp according to claim 9, wherein the LED assembly has [a] *an* LED surface plane which is mounted in close proximity to the total inner reflection lens focal point.

13. The multi-color LED lamp according to claim 9, wherein the center of the LED assembly is mounted in close proximity to the center axis.

14. The multi-color LED lamp according to claim 9, wherein the LED assembly is mounted on a base.

15. The multi-color LED lamp according to claim 9, wherein a housing is provided surrounding the outer reflector.

16. The multi-color LED lamp according to claim [9] *15*, wherein the total inner reflection lens is attached to a cover located on the housing.

17. The multi-color LED lamp according to claim [9] *15*, wherein the total inner reflection lens is part of a cover located on the housing.

18. A method for generating a mixed beam of light [by] *comprising:* generating light at multiple wavelengths by [a] *an* LED assembly comprising a plurality of LEDs and:

reflecting a first portion of said light by an outer reflector having a paraboloidal surface of revolution centered around a center axis and defining a reflector focal point;

[while reflecting a second] *receiving the remaining* portion of said light [forwarded from the plurality of LEDs] *at a concave light entrance surface of a total inner reflection lens, the remaining portion of said light incident on the concave light entrance surface* at an angle relative to the center axis that is less than the first portion of said light[forwarded from the plurality of LEDs], wherein the [second portion is reflected from a total inner reflection lens having a] concave light entrance surface [with] *includes a surface having* a radius of curvature to enable *the remaining portion of the* light to enter the total inner reflection lens at a right angle, and the total inner reflection lens having an outer contour with a paraboloidal surface of revolution centered around the center axis and defining a total inner reflection lens focal point; and wherein the reflector focal point is in close proximity to the total inner reflection lens focal point.

19. The method as recited in claim 18, wherein said reflecting consists of avoiding any refraction.

*20. The color mixing optics according to claim 1, further comprising a hemispherical lens disposed proximate a plurality of light emitting diode light sources, the hemispherical lens having a convex surface spaced apart from the concave light entrance surface of the paraboloidal total inner reflection lens and spaced apart from the outer reflector.*

*21. The multi-color LED lamp according to claim 9, further comprising a hemispherical lens disposed proximate a plurality of light emitting diode light sources, the hemispherical lens having a convex surface spaced apart from the concave light entrance surface of the paraboloidal total inner reflection lens.*

*22. An optic system comprising:*

*an outer reflector to reflect a first portion of light emitted by a light source; and*

*a total inner reflection lens having a concave light entrance surface to receive the remaining portion of the light emitted by the light source, the concave light entrance surface having a radius of curvature to enable the light to enter the total inner reflection lens at a right angle, the total inner reflection lens further having an*

*outer contour, wherein the outer contour of the total inner reflection lens is held a spaced distance within the outer reflector.*

*23. The optic system of claim 22,*

*wherein the outer reflector has a paraboloidal surface of revolution, and*

*wherein the outer contour of the total inner reflection lens has a paraboloidal surface of revolution.*

*24. The optic system of claim 23,*

*wherein the paraboloidal surface of revolution of the outer reflector is centered around a center of revolution;*

*wherein the paraboloidal surface of revolution of the outer contour of the total inner reflection lens is centered around the center of revolution; and*

*wherein the concave light entrance surface of the total inner reflection lens is centered around the center of revolution.*

*25. The optic system of claim 24, wherein a depth of the total inner reflection lens extends to a point that intersects a line that extends between a source point on the center axis and an edge point of the outer reflector.*

*26. The optic system of claim 22, wherein the total inner reflection lens is positioned within the outer reflector.*

*27. The optic system of claim 22, wherein the total inner reflection lens is integral with a cover located on the outer reflector.*

*28. The optic system according to claim 22, further comprising a hemispherical lens disposed proximate a plurality of light emitting diode light sources, the hemispherical lens having a convex surface spaced apart from the concave light entrance surface of the total inner reflection lens.*

*29. A lamp comprising:*

*a hollow outer reflector to provide a reflective surface;*

*a total inner reflection lens having a concave light entrance surface with a radius of curvature to enable light to enter the total inner reflection lens at a right angle, the total inner reflection lens further having an outer contour, wherein the outer contour is held a spaced distance apart from the reflective surface provided by the hollow outer reflector; and*

*an assembly configured to emit light, wherein the assembly is mounted within the lamp spaced apart from the concave light entrance surface of the total inner reflection lens;*

*wherein the reflective surface reflects a first portion of light emitted by the assembly and the concave light entrance surface of the total inner reflection lens receives the remaining portion of the light emitted by the assembly.*

*30. The lamp of claim 29, wherein the assembly further comprises a sensor configured to measure light emitted by the assembly.*

*31. The lamp of claim 30, wherein the assembly further comprises a plurality of LEDs.*

*32. The lamp of claim 29,*

*wherein the outer reflector has a paraboloidal surface of revolution; and*

*wherein the outer contour of the total inner reflection lens has a paraboloidal surface of revolution.*

*33. The lamp of claim 32,*

*wherein the paraboloidal surface of revolution of the outer reflector is centered around a center of revolution;*

*wherein the paraboloidal surface of revolution of the outer contour of the total inner reflection lens is centered around the center of revolution; and*

*wherein the concave light entrance surface of the total inner reflection lens is centered around the center of revolution.*

*34. The lamp of claim 33, wherein a depth of the total inner reflection lens extends to a point that intersects a line that extends between a source point on the center axis and an edge point of the outer reflector.*

*35. The lamp of claim 29, wherein the total inner reflection lens is positioned within the outer reflector.*

*36. The lamp of claim 29, wherein the total inner reflection lens is integral with a cover located on the outer reflector.*

*37. A lamp, comprising:*

*a hemispherical lens to receive an array that includes a plurality of different color output light sources;*

*a parabolic reflective surface spaced apart from the surface of the hemispherical lens; and*

*a paraboloidal total inner reflection lens spaced a distance from the parabolic reflective surface, the total inner reflection lens including a planar exit surface and a concave entrance surface spaced a distance apart from the surface of the hemispherical lens;*

*wherein the hemispherical lens comprises a planar base portion and a convex lens portion;*

*wherein the parabolic reflective surface and the paraboloidal total inner reflection lens share a common focal point; and*

*wherein the base portion of the hemispherical lens is positioned proximate the common focal point of the parabolic reflective surface and the paraboloidal total inner reflection lens.*

*38. The lamp of claim 37 wherein the hemispherical lens, the parabolic reflective surface, and the paraboloidal total inner reflection lens are positioned such that a first portion of light emitted by a light source disposed proximate the hemispherical lens falls incident on the parabolic reflective surface and the remaining portion of the light emitted by the light source passes through the paraboloidal total inner reflection lens.*

* * * * *